United States Patent [19]

Morgan et al.

[11] 3,876,832

[45] Apr. 8, 1975

[54] DIGITAL CRYPTOGRAPHIC SYSTEM AND METHOD

[76] Inventors: Barrie O. Morgan, 3404 Colgate, Dallas, Tex. 75225; Kenneth M. Branscome, 5935 Vanderbilt, Dallas, Tex. 75206; George E. Goode, 1222 Chippewa, Richardson, Tex. 75080; John Q. Atchley, 7432 Lynwood, Dallas, Tex. 75240

[22] Filed: Oct. 20, 1972

[21] Appl. No.: 299,387

[52] U.S. Cl. .......... 178/22
[51] Int. Cl. .......... H04l 9/04
[58] Field of Search .......... 178/22

[56] References Cited

UNITED STATES PATENTS

| | | | |
|---|---|---|---|
| 2,406,023 | 8/1946 | Locke | 178/22 |
| 2,406,829 | 9/1946 | Haglund et al. | 178/22 |
| 2,874,215 | 2/1959 | Zenner | 178/22 |
| 3,480,915 | 11/1969 | Eisenbies | 178/22 |
| 3,496,291 | 2/1970 | Meisingset et al. | 178/22 |
| 3,546,380 | 12/1970 | Sturzinger | 178/22 |
| 3,749,832 | 7/1973 | Lemoine | 178/22 |

*Primary Examiner*—Maynard R. Wilbur
*Assistant Examiner*—G. E. Montone
*Attorney, Agent, or Firm*—Richards, Harris & Medlock

[57] ABSTRACT

The specification discloses a digital cryptographic system operating under a digital coding scheme having forbidden control characters with common bit characteristics. In the encoding mode, clear digital data and randomized digital data are stored and selected bits of the clear and randomized digital data are modulo-2 added. The added bits are then examined to determine whether or not the bits have the common bit characteristics of the forbidden control characters. If so, the selected bits of the stored clear digital data are varied to prevent the subsequent generation of forbidden control characters in the encoded data. The clear digital data and randomized digital data are then modulo-2 added to generate encoded data. The present system is compatible with eight-level digital codes and the system includes parity bit checking techniques to ensure accuracy of operation. The present system may be operated as either an On-line or Off-line system and may be utilized to provide security of digital transmission between teleprinters or between a teleprinter and a digital computer or the like.

9 Claims, 9 Drawing Figures

DIGITAL CRYPTOGRAPHIC SYSTEM AND METHOD

FIELD OF THE INVENTION

This invention relates to the secure transmission of digital messages and more particularly relates to a cryptographic technique for enciphering and deciphering digital data.

THE PRIOR ART

It is necessary in a variety of environments to provide security to digital data by encoding, scrambling or enciphering the data during transmission to prevent unauthorized access to the data. Prior cryptographic techniques have included mechanical enciphering and "table look-up" methods. More recently, enciphering techniques have been developed for automatically encoding and decoding digital text. An example of an automatic digital cryptographic technique is disclosed in U.S. Pat. No. 3,522,374, issued July 28, 1970. Additionally, a digital cryptographic system of improved design is disclosed in U.S. patent application Ser. No. 134,319, now U.S. Pat. No. 3781472 filed Apr. 15, 1971, entitled "Digital Data Ciphering Technique" and assigned to the present assignee.

Previously developed digital cryptographic systems have generally been useful only with lower level digital coding schemes such as five-level codes. Such prior digital cryptographic systems have not had the capability of handling higher level digital coding schemes such as eight-level codes, wherein parity checking and forbidden control character techniques must be employed. Moreover, prior digital cryptographic systems have often been somewhat difficult to utilize due to a substantial amount of required manual operation, and a need has thus arisen for a digital cryptographic system which may automatically operate in encode and decode modes without required intervention by the operator.

SUMMARY OF THE INVENTION

In accordance with the present invention, a cryptographic system is provided which may operate under a digital coding scheme having forbidden control characters. The system modulo-2 adds clear digital data with randomized digital data to generate encoded data. Circuitry is operable prior to the modulo-2 addition to vary the clear digital data to prevent the generation of the forbidden control characters in the encoded data.

In accordance with a more specific aspect of the invention, a digital cryptographic system is provided which operates under a digital coding scheme having forbidden control characters with common characteristics. Registers are provided to store clear digital data and randomized digital bits. Circuitry combines selected bits of the clear digital data with randomized digital bits to generate encoded bits. Circuitry varies the stored clear digital data upon occurrence of the common characteristics in the encoded bits. Encoding circuitry then modulo-2 adds the stored clear digital data and the randomized digital bits to generate encoded digital signals.

In accordance with another aspect of the invention, a parity check system for a digital cryptographic system includes circuitry for transmitting enciphered digital data having a parity bit. Circuitry receives the enciphered digital data and detects the parity bit. Deciphering circuitry decodes the enciphered digital data to generate clear digital data. Circuitry is responsive to the detecting circuitry for generating a parity bit for the clear digital data which corresponds with the detected parity of the enciphered digital data.

In accordance with another aspect of the invention, an On-line digital cryptographic system includes circuitry for receiving digital data from an input data terminal and from a remote encoding station. Encoding circuitry is responsive to the receiving circuitry for automatically encoding digital data received from the input data terminal. Decoding circuitry is responsive to the receiving circuitry for automatically decoding data received from the remote encoding station.

In accordance with yet another aspect of the invention, a digital cryptographic system is operable in Off-line and On-line modes and includes first and second synchronizer circuits and first and second storage registers. Encoding circuitry receives clear digital data and randomized digital data from the registers for generating coded digital data. In the Off-line mode of operation of the system, the clear and randomized digital data is stored in the first storage registers under the control of the first synchronizer circuit prior to being shifted into the encoding circuitry. In the On-line mode of operation, the clear and randomized digital data is sequentially stored in the first and second registers under the sequential control of the first and second synchronizer circuits prior to being shifted into the encoding circuitry.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
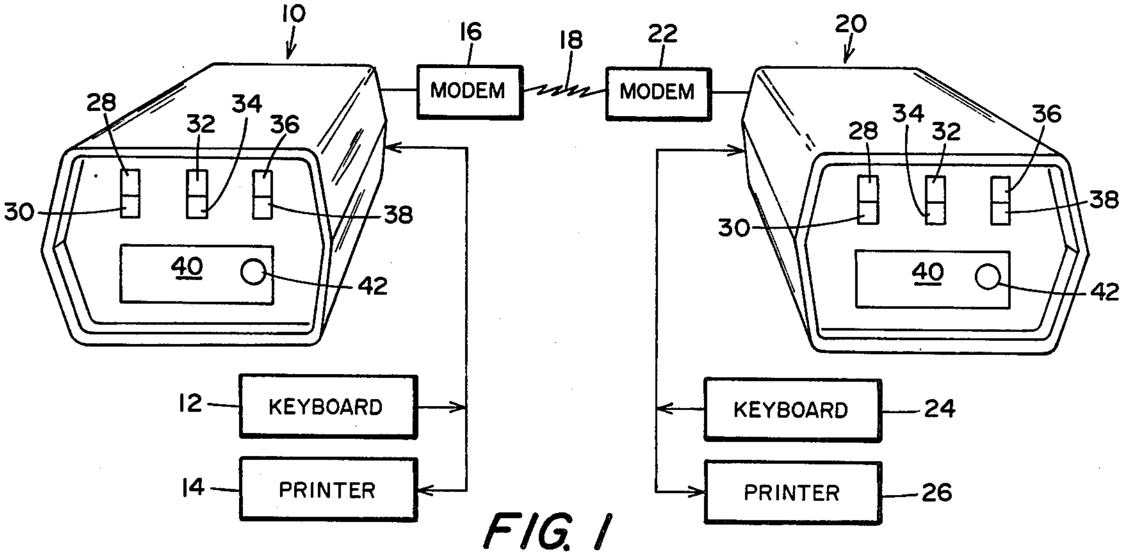
FIG. 1 is a block diagram of a typical installation of the present cryptographic system.

FIG. 1 illustrates a block diagram of the present cryptographic system utilized with a teleprinter network in an On-line mode. A first cryptographic device 10 constructed in accordance with the invention is connected to a teleprinter including a keyboard 12 and a printer or display device 14. The cryptographic device 10 is connected through a modem 16 to a conventional telephone line 18. A second cryptographic device 20 at a remote station is connected to the telephone line 18 via a modem 22. The cryptographic device 20 is connected with a standard teleprinter device including a keyboard 24 and a printer 26.

Each of the cryptographic devices 10 and 20 include a Power On button switch 28 and an Alarm Reset button switch 30. An Encode button switch 32 may be manually depressed in order to encode digital data, while a Decode button switch 34 may be manually depressed to decode digital data. Lamps are disposed behind each of the button switches 28–34 to indicate the operation mode of the device. A lamp 38 illuminated when the system is operating in the private mode, while a lamp 36 is illuminated when the system is operating in the clear mode.

A door 40 is provided on the front of each of the cryptographic devices and includes a lock 42 which must be unlocked by a suitable key before the door 40 may be opened. A plurality of eight position circular thumbwheel switches, not shown, are disposed behind the door 40. The thumbwheel switches may be individually manually rotated to provide any one of a large number of different combinations in order to select a particular code from the random code generator of the cryptographic system.

An important aspect of the present invention is that the cryptographic devices 10 and 20 may be operated in either Off-line or On-line modes. A switch is provided on the back panel of each of the cryptographic devices of the invention to enable switching of the cryptographic device to either an Off-line or On-line mode of operation.

In operation of the present cryptographic system in the Off-line mode, the switches on the back of the systems 10 and 20 are switched to the Off-line position to remove the systems from connection between the teleprinters and the telephone lines. The teleprinter switch is then placed in the LOCAL position and the power switch 28 of the cryptographic device 10 is depressed. At this time the Power, Encode and Clear lights are illuminated on the cryptographic device 10.

The particular code for the day is then entered into the cryptographic device 10 by opening a door 40 with a special key which is inserted and twisted in the lock 42. The door 40 is removed and the power to the cryptographic device 10 is cut off in response to the removal of the door. The desired code for the day is entered into the thumbwheel switches or other suitable code entering apparatus behind the door 40. The door 40 is then reinserted and the key is turned to lock the door. The same procedure is also followed at the cryptographic device 20 by the operator at that station and the identical code for the day is entered into both cryptographic devices 10 and 20. Alternatively, the code for the day may be input into the systems through the keyboard by the operator.

Assuming a desire to encode a message with the cryptographic system 10 and to decode the message with the cryptographic device 20 in the Off-line mode, a clear punched tape is prepared on the teleprinter keyboard 12 and printer 14 in the conventional manner. The teleprinter is then placed in the LOCAL position and the tape punch is turned on. To operate in the clear mode, the teleprinter is conventionally operated. To then go into the private mode, the control character $B^c$ is typed in on the keyboard, followed by any three keyboard characters. These three characters allow the cryptographic device 10 to generate prime or synchronizing data in subsequent operations.

After the private text has been typed on the keyboard 12, and it is desired to again go into the clear mode, the control character $C^c$ is typed in on the keyboard 12. The tape prepared by the above-described manner provides a clear text tape with coding control characters embedded therein. When the tape is then placed in a tape reader and the teleprinter is placed in LINE, the cryptographic device 10 operates in response to the coding control characters such that the tape punch prepares an encoded tape. The encoded tape may then be read and transmitted to the remote teleprinter in the conventional manner.

The remote teleprinter will reproduce an encoded tape which is then torn off and given to the predetermined secure communications operator. To decode the encoded or ciphered tape, the secure communications operator ensures that the correct code for the day has been set into the cryptographic device 20 behind the door 40. The encoded tape is then placed in the reader and the cryptographic device 20 power switch 28 is depressed. The decode button 34 is also depressed and is illuminated. The teleprinter switch is turned to LINE and the tape is mounted on the reader. The tape reader is turned on by placing the switch in the START position. The decoded message will now be printed out by the printer 26, with both clear and private portions clearly readable.

If during the above-described procedure, the alarm light comes on, an error in the enciphering or deciphering circuitry is indicated. The alarm button 30 is then depressed and the operation is attempted again. If the alarm indication persists, a malfunction of the system is indicated.

In many cases, it is desirable to operate the present cryptographic system in an On-line mode wherein the cryptographic devices 10 and 20 are interconnected directly in the transmission line and provide coding and decoding operations on a substantially real time basis. To operate the cryptographic devices 10 and 20 in the On-line mode, the On-line mode switch on the back of the devices is operated. In order to transmit coded data from the device 10 to the device 20, the operator operates the keyboard 12 and types in a control character $B^c$ plus any three characters. During the typing of the three characters, the cryptographic device 10 generates priming or synchronizing bits to the remote device 20. This synchronizes the devices in a manner subsequently to be described and subsequent characters typed on the printer 14 are transmitted through the cryptographic device 10 wherein they are encoded. The encoded characters are then transmitted through the modem 16 to the telephone line 18.

The enciphered digital data is directed through the modem 22 to the cryptographic system 20 which is automatically placed in the decode mode. The digital data is then printed out on the printer 26 as clear text, although the transmitted digital data on the telephone line 18 is garbled to the unauthorized person.

The operator inputting data into the keyboard 12 receives the data printed out on the printer 14 as clear text, although the transmitted data is encoded. When it is desired to reverse the transmission from the cryptographic device 20 to the cryptographic device 10, the operator at the device 20 initiates typing operations at his keyboard. This reverses the operation of the devices such that the cryptographic device 20 is automatically placed in the encode mode and the device 10 is placed in the decode mode. The operator at the device 20 may then type in the private mode as long as desired and the subsequent data typed on the keyboard 24 will be enciphered, although the information will be printed out as clear text on the printer 26. The data input at the keyboard 24 is encoded by the device 20 and transmitted through the modem 22, telephone line 18 and modem 16 as encoded or scrambled digital data. When clear transmission is desired, either operator may type in a C$^c$ on his keyboard.

The cryptographic device 10 receives the encoded data and decodes it and prints it out as clear text on the printer 14. Operation of the cryptographic device of the present invention in the On-line mode is particularly advantageous when communicating with a remote terminal such as a remote digital computer when a substantially real time operation is required. The capability of the present system of operating as either an Off-line or On-line device, plus the automatic switching of the present system between encode and decode modes, provides an extremely versatile cryptographic system.

Figure 2:
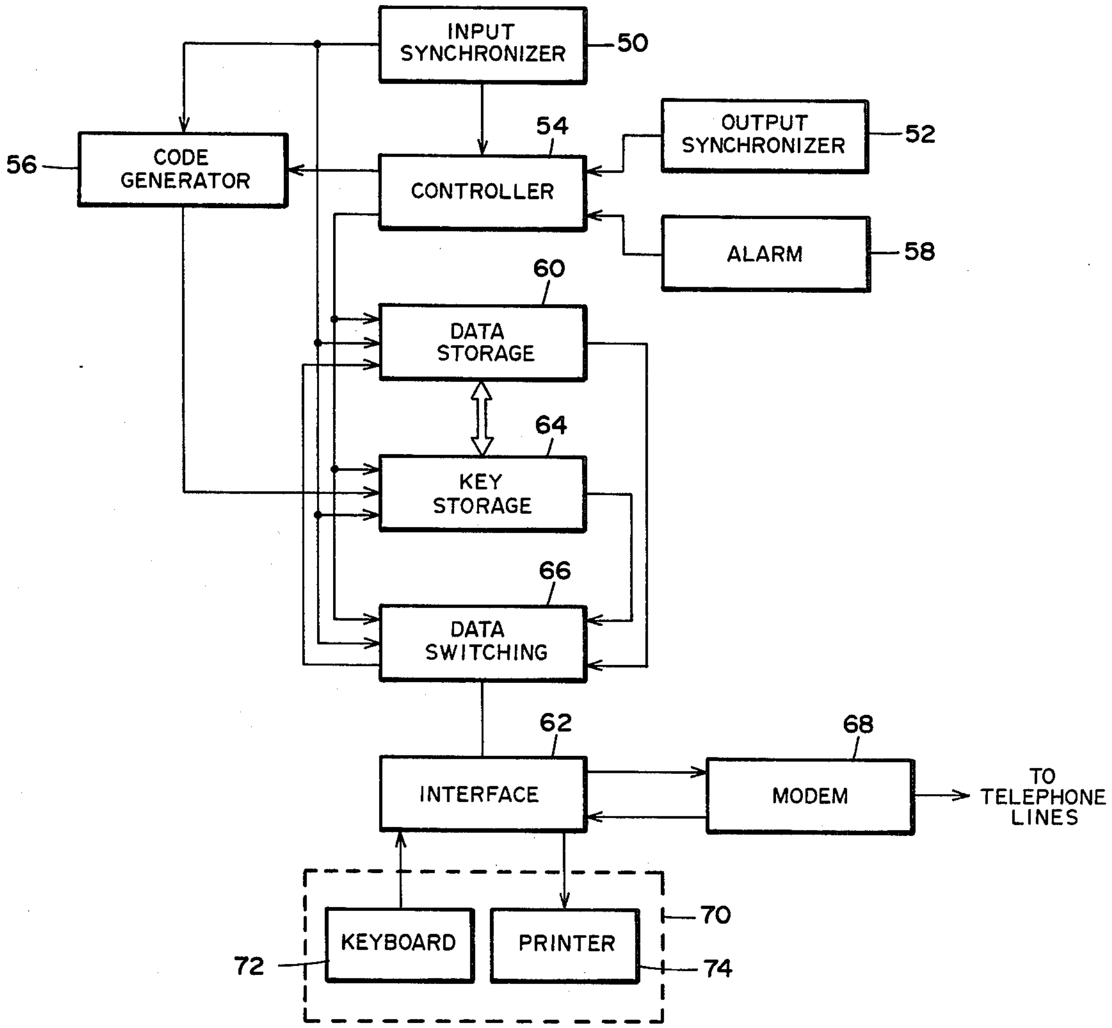
FIG. 2 is a block diagram of the circuitry of a cryptographic system according to the invention.

FIG. 2 illustrates a block diagram of one of the cryptographic devices according to the invention. An input synchronizer 50 includes a free running crystal oscillator and a programmable countdown chain which will generate clock signals corresponding to a selected baud rate. For example, the device 10 may have baud rates ranging from 110 baud to 9600 baud. The synchronizer 50 generates a burst of timing pulses or clocks utilized in stepping the device through the required operations at the correct baud rate. Synchronizer 50 operates only as a character is being shifted through the device; otherwise, the synchronizer 50 is in an idle state. An output synchronizer 52 is utilized to control, in coordination with input synchronizer 50, the output of encoded data when the cryptographic system is being operated in the On-line mode. The controller 54 comprises logic circuitry which keeps track of the operational state of the machine.

A random code generator 56 generates randomized digital key data for use in enciphering clear digital data in a manner to be subsequently described. The code generator is controlled by the input synchronizer 50 and the controller 54. The code generator 56 may comprise any suitable source of randomized digital signals, but preferably comprises the random code generator described and claimed in the copending patent application "Random Digital Code Generator," Ser. No. 134,320 by Goode et al, filed Apr. 15, 1971, and assigned to the present assignee. The description of operation of the code generator found in the above-captioned copending patent application is incorporated herein.

The code generator 56 generates eight random digital key bits for each character to be encoded by the system. Further, the code generator 56 generates a sequence of randomized prime bits for synchronization. The code generator 56 is interconnected such that predetermined forbidden control characters cannot be generated by the generator. Briefly, the code generator 56 includes a plurality of code generator registers, two of which are generally used to generate a series of bits of prime synchronizing data. When the private state of the machine is entered, the contents of the two code generator registers are shifted out as prime information. This prime information is continually monitored to ensure that none of the forbidden control characters occur. If one forbidden control character does occur, the last bit of the prime information is changed and the prime information is cycled back into the code generator so that the internal state of the machine has been modified so as not to contain forbidden control characters.

An alarm circuit 58 detects the operation of the code generator 56 and drives and alarm and inhibits further operation of the system upon detection of the malfunction. A data storage circuit 60 receives and stores plan text data via the interface circuit 62. The plain text data is stored in data storage 60 circuit 62 and the data switching circuit 66. The plain text data is stored in data storage 60 during the checking of forbidden control characters and prior to modulo-2 addition with random digital key bits stored in the key storage circuit 64. A data switching circuit 66 includes logic for routing the signals of the circuit within the system and also includes the parity checking and generating circuitry of the invention.

The interface 62 includes circuitry to convert the logic level of the present cryptographic system into either EIA interface voltages for transmission through the modem 68 to the telephone lines or TTY loop current for connection to a teletype 70 including a keyboard 72 and printer 74.

In operation of the system as shown in FIG. 2, in the On-line encode mode, priming data is transmitted to synchronize the stations. Characters are then typed on the keyboard 72 and are applied through the interface 62 and are routed through the data switching circuit 66 for storage in the data storage 60. At the same time, the synchronizer 50 generates the necessary clocks to clock the data into the data storage 60. The code generator 56 at this time is requested by the controller 54 to generate eight bits of randomized digital key which are simultaneously loaded into the key storage circuit 64. The plain text data word and the randomized key word are examined at selected bits, to be later described, to determine whether or not the combination of two words will result in a ciphered character that is a forbidden control character. If so, bits of the plain or clear text data word stored in the data storage 60 are changed to prevent the generation of the forbidden control character. The clear text data and the randomized key data are then shifted out under the control of synchronizer 52 and modulo-2 added in the data storage circuit 60. The resulting enciphered digital word is routed from the data storage 60 and through the data switching circuit 66 and the interface 62 for application through the modem 68 to the telephone line for transmission to a remote station for decoding.

In operation of the system shown in FIG. 2, in the On-line decode mode, an enciphered character is applied through the modem 68 and the interface 62 to the data switching circuit 66. A parity check is conducted and the endiphered word is then loaded into the data storage 60. Simultaneously the synchronizer 50 and controller 54 request the code generator 56 to generate the identical bits of randomized digital key by which the word was originally enciphered. The randomized digital key is loaded into key storage 64. Predetermined bits of the words stored in the data storage 60 and key storage 64 are compared, and if a predetermined logic pattern is determined, the clear text word in the data storage 60 is varied. Thus when the clear text word is modulo-2 added with the randomized key in the key storage 64, the original clear text word will be generated. The clear text word is then applied to the data switching 66 wherein the same parity as the enciphered word is added. The clear text word is then applied through the interface 62 to the printer 74 of the teletype 70.

As previously noted, when the system shown in FIG. 2 is in the Off-line mode and encoding, data is entered in the keyboard 72 and the only output generated by the system is the generation of enciphered text on the printer 74. In the decode mode when the system is in the Off-line mode, the enciphered text is applied via the keyboard 72 or a tape reader and the enciphered text is applied through the cryptographic device and clear text is printed out on the printer 74.

However, when the system is operated in the encoding and On-line mode, data is entered in on the keyboard 72, clear text appears at the printer 74 and enciphered text is generated through the modem 68 to the telephone lines. In the decoding mode, data is received through the modem 68 and is decoded in the cryptographic system and is printed out as clear text on the printer 74.

As previously noted, when the system shown in FIG. 2 is in the Off-line mode, only the input synchronizer 50 is required, as substantially real time operation is unnecessary. However, when the system shown in FIG. 2 is operated in the On-line mode, the characters must be shifted through the cryptographic device without any substantial storage time, and thus the output synchronizer 52 is required.

In operation of the synchronizers 50 and 52 in the On-line mode, the synchronizer 50 detects the input of a character and generates the necessary clocks to shift the data into the data storage 60 wherein necessary corrections are made to prevent the generation of forbidden control characters. The word is then automatically shifted in parallel to another set of registers and the output synchronizer 52 is enabled to shift out the enciphered data. There is a very small amount of delay in time between shifting of the input synchronizer 50 and the output synchronizer 52, but the characters are not stored in the device.

SYNCHRONIZER

Figure 3:
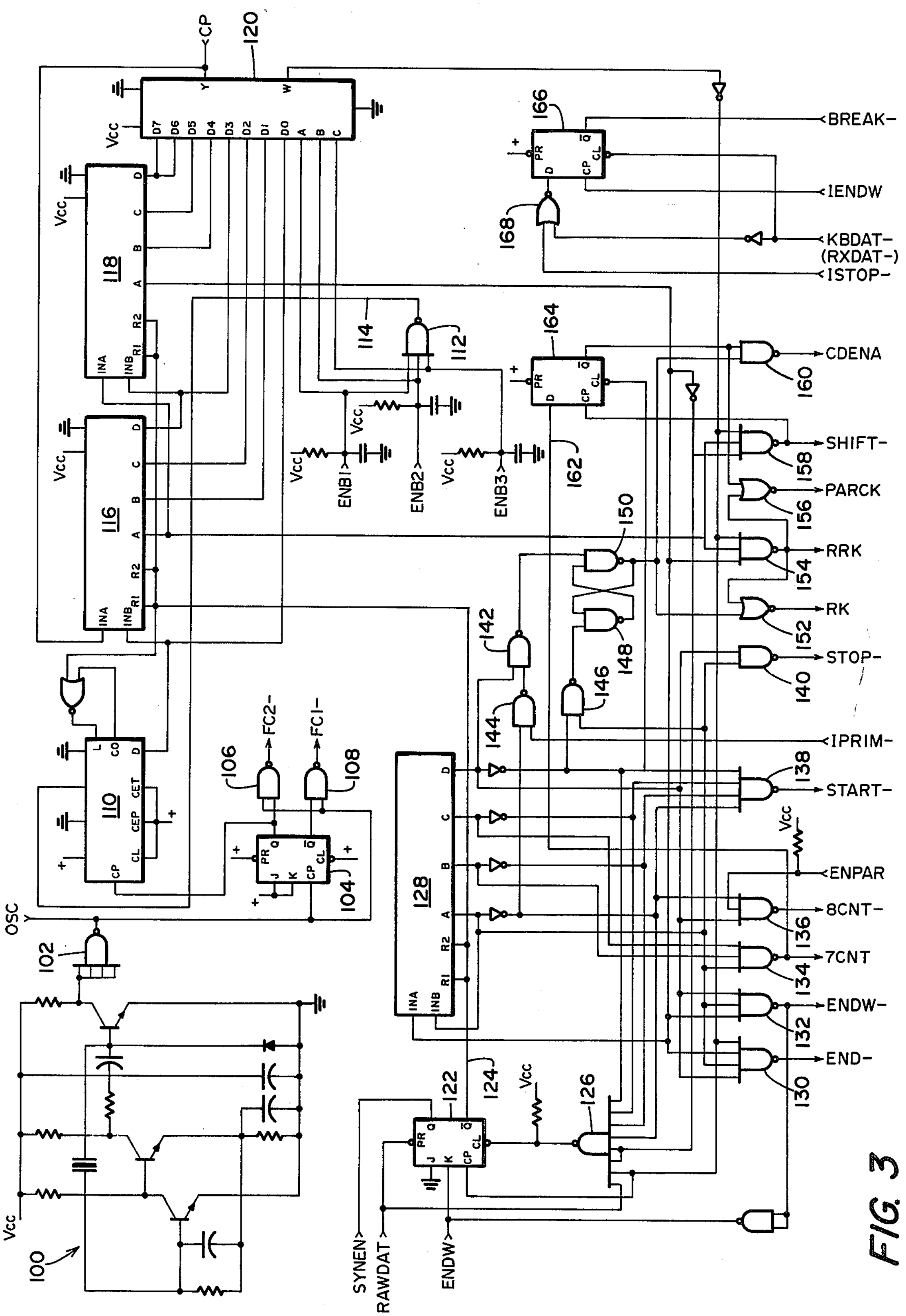
FIG. 3 is a schematic diagram of the synchronizer circuitry of the present system.

Referring to FIG. 3, the synchronizer circuitry of the invention is illustrated. This circuitry comprises either synchronizer 50 or 52, but the output synchronizer 52 derives its clock from input synchronizer 50, and thus does not require oscillator circuitry. The oscillator 100 is comprised of a fixed crystal and transistors interconnected in an oscillator circuit, to generate and 844.8 KHz signal applied through a Schmidt trigger 102. The signal is buffered and squared by the Schmidt trigger 102 and is applied to a flipflop 104 which, in conjunction with NAND gates 106 and 108, generate high speed fast clock phase 1 and fast clock phase 2 signals (FC1- and FC2-) for operation of the code generator. The clock signals FC1- and FC2- are 25 percent duty cycle and are 180° out of phase with one another.

A counter 110 comprises a multimodulous SN74161 counter which may divide either by 11 or 15, depending upon the baud rate selected. If a baud rate of 110 is selected, the counter 110 divides by 15. If the other baud rates are selected, the counter 110 divides by 11. The determination of the baud rate of counter 110 is determined by a NAND gate 112 at inputs ENB1-3. The ENB1–3 signals comprise a 3-bit code denoting the eight possible baud rates. The 3-bit code is derived from an octal switch located on the back panel of the system which may be manually operated to select the desired baud rate. The output of gate 112 is applied via lead 114 to the counter 110.

Counters 116 and 118 comprise SN7493 counters to provide a binary countdown stream which divides the output of counter 110 by 2 in order to derive the baud rates. The appropriate baud rate selected is provided by the multiplexer 120 and is generated as a signal CP, which is known as the baud rate clock which is used to clock the additional circuitry of the system.

When data is received by the keyboard of the teleprinter from the modem, the data is termed the RAWDAT signal and is applied to a flipflop 122. Reception of the RAWDAT signal sets the flipflop 122 and allows the counters 116 and 118 to run via a signal applied on lead 124. When the end of the RAWDAT character, denoted by the ENDW signal, is applied to the flipflop 122, the flipflop is reset and the counters 116 and 118 are cleared. Thus, the counters 116 and 118 generate a burst of clock only when a character is being received. A NAND gate 126 prevents false starts by not allowing the synchronizer to initiate operation unless the pulse is at least a quarter bit in length. This prevents erroneous starts from noise on the data line.

A counter 128, which in the preferred embodiment comprises an SN7493 binary counter, drives the timing pulses of the invention. Outputs from the counter 128 are interconnected with NAND gates 130–140 to generate a plurality of timing pulses. The END- signal denotes the end of a character. The ENDW- signal also denotes the end of a character, but is a wider pulse which is required in the timing of the circuitry. The signal 7CNT- denotes the occurrence of the seventh data bit. The signal 8CNT- denotes the occurrence of an eighth data bit, which is useful in the detection and generation of parity bits. ENPAR is an enable parity signal. If the ENPAR signal is grounded, the parity function will not operate. The START- signal generated by the NAND gate 138 denotes that the start pulse or the start bit of the character is presently being loaded into the system. The IPRIM- signal denotes that the encoder is in the prime state and is utilized in the synchronizer circuit to generate subsequent functions. The STOP- signal denotes that the stop pulse has occurred or that the system is entering the stop bit. Outputs of the counter 128 are also interconnected through NAND gates 142–146 and through a latch comprised of NAND gates 148 and 150 to control gates 152–160 to generate other timing signals.

The RK signal appearing at the output of the NOR gate 152 is a request for key signal, eight of which are generated for each character input to the system in order to generate randomized key data. The signal RRK- is a request key signal and is utilized as a reference signal. The signal PARCK is a parity clock signal utilized in the serial parity checking circuitry of the data switching system. The SHIFT- signal denotes the center of each data bit and is used for clocking the data out of registers in the system. The signal CDENA is generated from the output of the NAND gate 160 and denotes the portion of the character which should be enciphered, excluding the start and stop bit.

The output of gate 134 is connected via the lead 162 to a flipflop 164, which generates an input to the gate 160. A flipflop 166 is connected to the output of a NOR gate 168 to generate a BREAK signal, which denotes the absence of the stop pulse of a character from either the KBDAT- or RXDAT- signals, which denote keyboard data or receive data. The flipflop 166 also uses the IENDW and the ISTOP- signals to generate BREAK- signals, which indicates that a break in the line has been detected.

CONTROLLER

Figure 4:
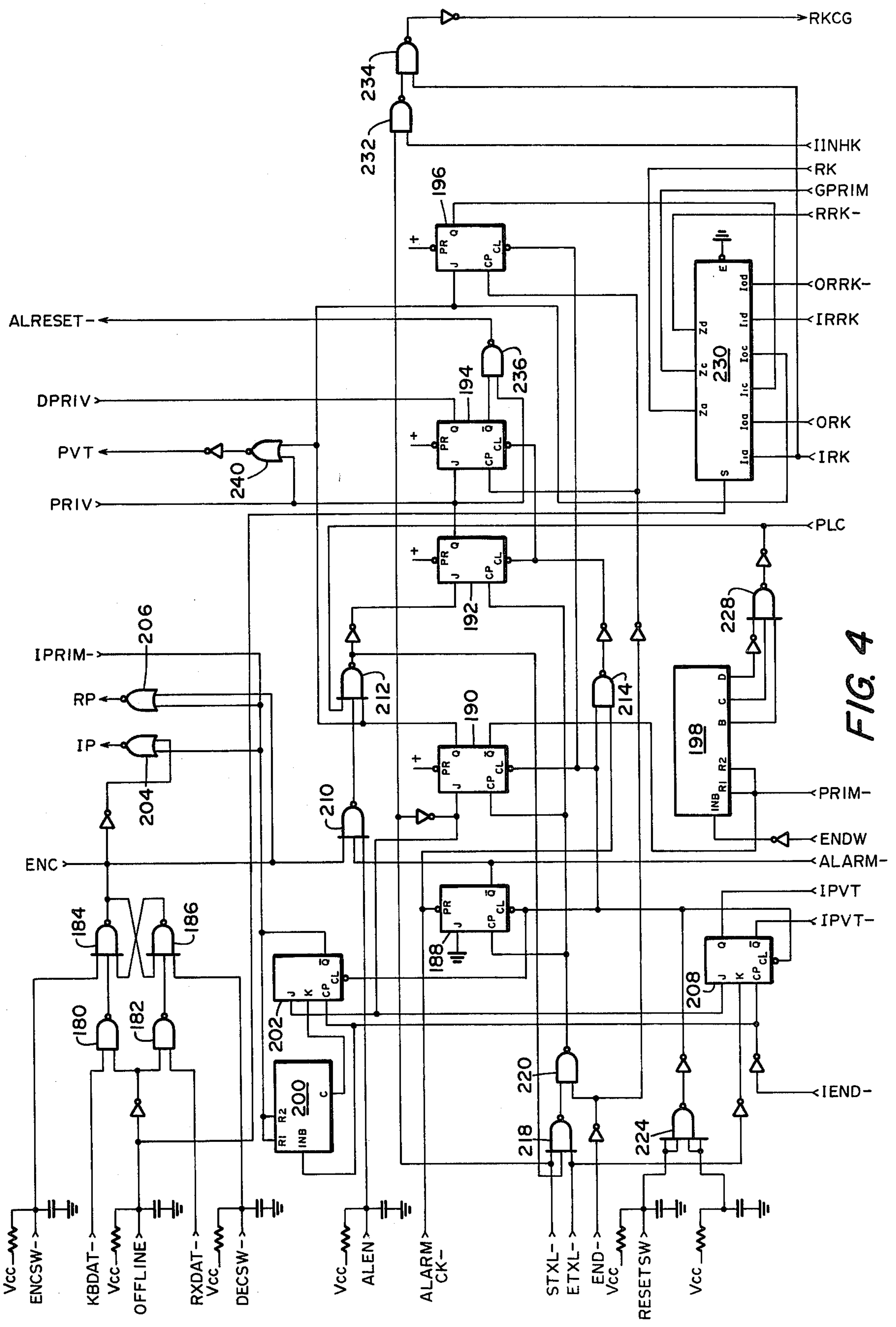
FIG. 4 is a schematic diagram of the controller circuitry of the invention.

FIG. 4 illustrates in schematic detail the circuitry of the controller circuit 54 shown in FIG. 2. A latch comprises four NAND gates 180–186. The signal ENCSW denotes the depression of the encode push button on the front of the cryptographic system and the signal DESCW denotes the depression of the decode push button. The signal KBDAT- and RXDAT-, previously identified in FIG. 3, will automatically set or reset the latch comprising the gates 180-186 in the On-line mode. The OFFLINE signal denotes that the device is operating in the Off-line mode.

Upon occurrence of the OFFLINE signal, the latch is set or reset according to one of the signals ENCSW or DECSW. When the OFFLINE signal becomes a logical zero, denoting On-line operation of the system, then the signals KBDAT- or RXDAT- will automatically set or reset the latch. The output of the latch is a signal ENC which denotes whether or not the machine is in the encode or decode mode.

Flipflops 188, 190, 192, 194 and 196 are utilized to denote the various states of operation of the machine. Flipflop 188 denotes the alarm state, flipflop 190 denotes the prime state, flipflop 192 denotes the normal private state, flipflop 194 denotes a delayed private state as used for timing purposes only, and flipflop 196 denotes the delayed prime state and is also used for timing purposes.

The counter 198 receives the ENDW and PRIM signals and generates a signal indicating the occurrence of the third character after the machine has entered the prime state. This denotes that the prime sequence is complete and signals the machine to transfer into the private state. A similar counter 200 is under the control of the input synchronizer 50, and counter 198 is under the control of either the input synchronizer 50 or the output synchronizer 52, depending upon whether or not the machine is operating in the Off-line or On-line mode.

A flipflop 202 generates a special signal to the code generator denoting that the generation of prime is taking place. The output of flipflop 202 is further decoded by NOR gates 204 and 206 to indicate whether or not the machine is initiating prime by the generation of signal IP or whether or not the device is receiving prime, as indicated by the signal RP. A flipflop 208 operates as a latch indicating that the machine is either in the prime or private state.

The ALEN signal is a test function which causes the machine not to require the alarm checking circuit to perform in order to enter the private state. The ALEN signal is applied through a NAND gate 210 and a NAND gate 212 which is connected to the flipflop 192. The ALARMCK signal is an alarm check which denotes each time the machine enters the prime state and a simulated alarm condition exists prior to the time the machine will be allowed to enter the private state. The ALARMCK signal is applied through a NAND gate 214 to the flipflops 192 and 194.

The STXL- signal is a latch signal denoting the occurrence of the start of text character (STX or $B^c$) in order to switch the machine into the private state. The ETXL- signal is a latch signal denoting the occurrence of the end of a text character (ETX or $C^c$) which switches the machine back into the clear mode. The STXL and ETXL signals are applied through NAND gates 218 and 220 to the flipflops 188, 190 and 192. The END- signal is a signal from the synchronizers to denote the end of a character and is applied through inverters to the flip-flops 194 and 196.

The RESETSW signal denotes the reset and is derived from the alarm push button on the front panel of the device. The RESETSW signal is utilized to reset the machine to the clear state. This signal is applied to an input of a NAND gate 224 which is applied to flipflops 188 and 190 and to the input of gate 214. The IEND- signal denotes the end of a character from the input synchronizer 50. All signals with a prefix of I denote that the signal comes exclusively from the input synchronizer, with all signals of a prefix of O denoting that the signal comes from the output synchronizer 52. The output signals IPVT and IPVT- are two signals that denote that the machine is in a prime or in the private state. The ALARM- signal generated by flipflop 188 is applied to an input of gate 210 to denote that an alarm condition is in existence to indicate that a malfunction has been detected in the code generator.

The signal ENDW denotes the output signal from one of the two synchronizers 50 or 52. The signal PRIM- denotes that the machine is in the prime state. The counter 198 is connected through a NAND gate 228 to generate the PLC signal to indicate that the priming operation is complete. The signals IRK and ORK are outputs from the input and output synchronizers and denote requests for key. These signals are applied to a multiplexer 230. Similarly, the signals IRRK- and ORRK- are two timing signals corresponding to the requests for key from both the input and output synchronizers to apply to the multiplexer 230. The signal RRK is a selection signal of either the signals IRRK or ORRK, depending upon whether the machine is in the Off-line or On-line mode. A signal GPRIM is a data prime signal which denotes that the machine is in the prime state. This signal is either delayed in the case of Off-line operation, or is in real time in the case of On-line operation.

The signal RK applied to the $Z_a$ terminal of the multiplexer 230 is a request for key signal utilized to request a random key bit from the code generator. The signal IINHK is an inhibit key signal. When a control character is typed in from the keyboard of the teleprinter, the control character is automatically sent out in the clear. During this time, a randomized key word was generated by the random code generator which was then not required to be used in the transmission of this control character. Thus, the system will not request a key word from the code generator, since the key has already been generated. The IINHK signal is then applied to the input of a NAND gate 232 in order to inhibit the generation of one randomized key word from the code generator. The signal RKCG which is output from the NAND gate 234 is the request for key to the random code generator.

The ALRESET- signal is the alarm reset signal which is applied at the output of a NAND gate 236. Once the machine has simulated an alarm condition in the prime state and has entered the private state, the alarm check circuit must be reset, and so the ALRESET- signal is generated. The signal DPRIV denotes that the machine is in the delayed private state, which is one character after the machine has entered the private state. The PVT signal is generated by an inverter at the output of a NOR gate 240 and indicates that the machine is in the prime or private state. The signal PRIV indicates that the machine is in the private state. The signal IPRIM- denotes that the machine is in the prime state and is timed by the input synchronizer.

DATA STORAGE

Figure 5:
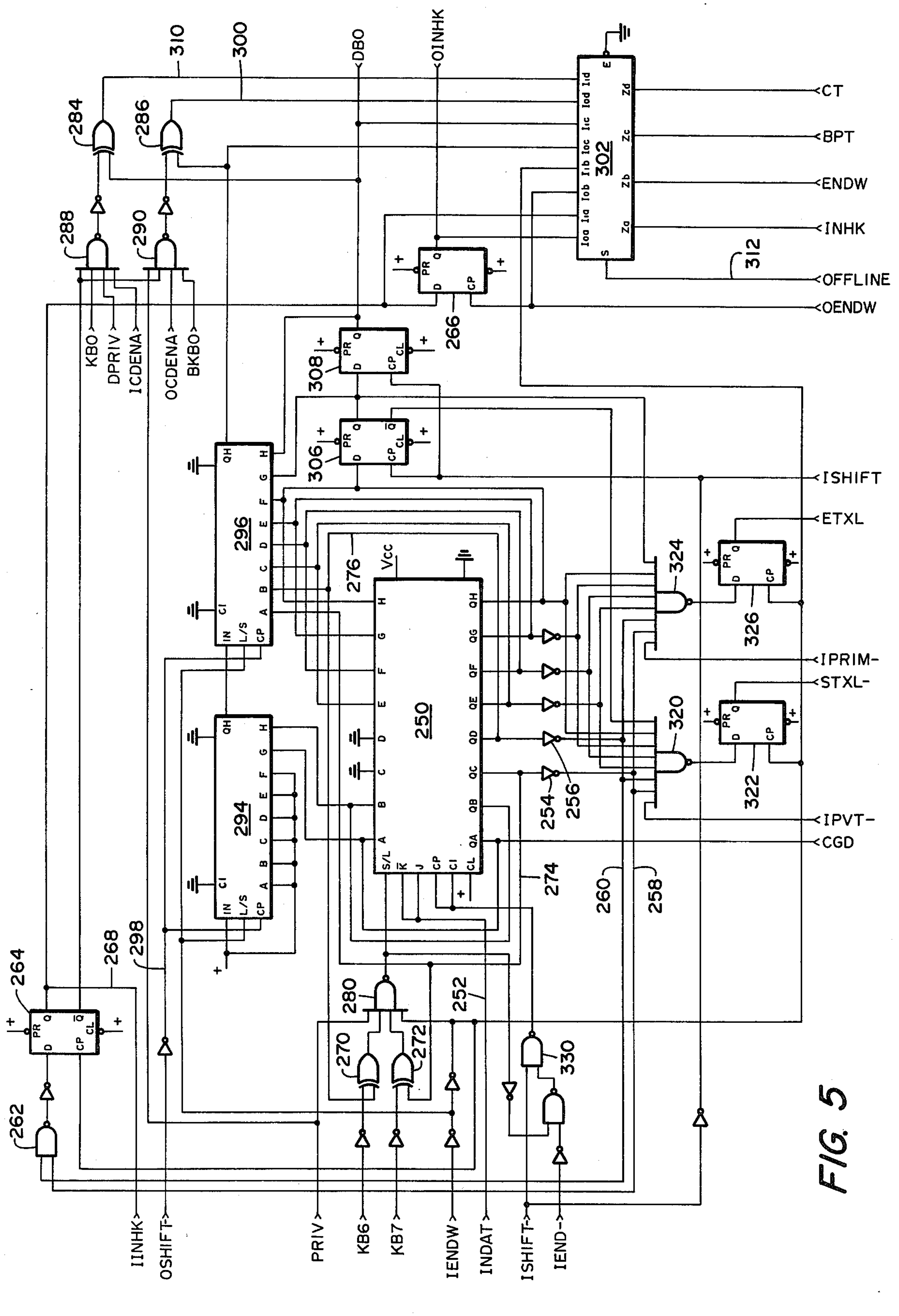
FIG. 5 is a schematic diagram of the data storage circuitry of the invention.

FIG. 5 illustrates in schematic detail the circuitry of the data storage circuit 60 previously described in FIG. 2. The present device operates with higher level coding schemes, and in the preferred embodiment operates with an eight-level coding scheme. As is well known, a plurality of such eight-level coding schemes exist, but in the preferred embodiment, the eight-level ASCII code is utilized. The following control characters are provided in the ASCII coding scheme:

| | |
|---|---|
| NUL | DLE |
| SOH | DC1 |
| STX | DC2 |
| ETX | DC3 |
| EOT | DC4 |
| ENQ | NAK |
| ACK | SYN |
| BEL | ETB |
| BS | CAN |
| HT | EM |
| LF | SUB |
| VT | ESC |
| FF | FS |
| CR | GS |
| SO | RS |
| SI | US |

Due to the fact that the above-captioned control characters provide predetermined control functions, it is necessary to directly transmit each of the above-captioned control characters without encoding or enciphering. Additionally, it is important to ensure that none of the above control characters are generated as a result of enciphering by the present cryptographic system, in order to prevent undesired control functions from occurring. Thus, structure is provided in the data storage circuit to prevent the encoding of digital words as forbidden control characters.

In the ASCII code, each of the above-noted control characters have a common characteristic in that their bit positions 6 and 7 are both always logic zero. This characteristic is not shared by other non-control characters. Thus, as will be later described in detail, prior to transmission of an encoded word, the encoded bits 6 and 7 are inspected to determine whether or not both bits are logic zero. If so, it will be seen that a forbidden control character is about to be transmitted, and the system thus operates to inhibit the generation of the forbidden control character and to vary the clear text word in order to ensure that a forbidden control character is not generated.

Referring to FIG. 5, an 8-bit clear or uncoded data word is serially loaded into a register 250 by the signal denoted as INDAT via lead 252. Once the 8-bit clear text digital word has been loaded into the register 250, bits 6 and 7 of the digital word are detected via terminals $Q_c$ and $Q_d$ of the resiter 250 and are applied through inverters 254 and 256 to leads 258 and 260. The bits 6 and 7 are then applied through a NAND gate 262 which sets a flipflop 264 upon the detection of each of the two bits having a logic zero level. The flipflop 264, upon the detection of two logic zeros, latches and inhibits the generation of random key data by setting of the flipflop 266. The flipflop 266 generates the signal OINHK which denotes the inhibiting of random key data as controlled by the output synchronizer 52. The output of the flipflop 264 is applied via a lead 268 to provide the signal IINHK which denotes inhibiting of random key as timed according to the input synchronizer 50.

Thus, if a control character is typed in on the keyboard of the teleprinter, the character will subsequently be sent out as clear text, and the randomkey word which is generated to encipher the character will not be used and will be reserved for the following character, or for the next character which is not a control character. This operation is particularly advantageous for use with a digital computer which may insert control characters not originally in the enciphered stream. Insertion of the characters in the middle of an enciphered stream may cause loss of snychronization. However, with the use of the present circuit, the insertion of control characters in the enciphered stream does not cause the loss of synchronization because the generation of the characters never advances the random code generator. Only non-control characters advance the code generator.

Assuming that a non-control character is input as the INDAT signal to the register 250, a random key word is generated and is stored in the key circuit 64 shown in FIG. 2. Bits 6 and 7 of the random key word are applied as signals KB6 and KB7 through inverters to inputs of exclusive OR gates 270–272. In addition, bits 6 and 7 of the clear data word stored in register 250 are applied through leads 274 and 276 to the inputs of gates 270 and 272. Gates 270 and 272 comprise modulo-2 adders, which generate outputs which are applied to a NAND gate 280. If the outputs of the modulo-2 adders 270 and 272 are both logic zeros, this indicates that the clear text word now stored in the register 250 will be enciphered into a forbidden control character. As indicated, such enciphering into a forbidden control character must be prevented, so NAND gate 280 applies a parallel loading signal to terminal S/L of register 250. This causes the bits 6 and 7 of the clear text digital words stored in the register 250 to be cleared or set to zero. The clear text data word is then shifted out through an exclusive OR gate 284 or 286, depending upon whether a system is in the Off-line or On-line mode.

The randomized key word is input through either a NAND gate 288 or 290, as either signal KBO or BKBO, depending again upon whether or not the system is operating in the Off-line or On-line mode. As bits 6 and 7 of the clear text data word stored in register 250 were reset to zero, the modulo-2 addition from either gate 284 or 286 will result in bits 6 and 7 of the enciphered word equaling bits 6 and 7 of the randomized key word.

When the device is operating in the On-line mode, the clear text data word is stored in the register 250, and the bits 6 and 7 are sampled by the gates 270 and 272 in the previously described manner. If the bits 6 and 7, when modulo-2 added with the bits 6 and 7 of the key word, both equal logic zero, then the bits 6 and 7 of the clear data word stored in the register 250 are reset to zero in the manner previously described in order to prevent the generation of a forbidden control character. The entire clear data word is then loaded from the register 250 in parallel to the registers 294 and 296 under the control of the input synchronizer 50, shown in FIG. 2. Once the parallel transfer in the registers 294 and 296 is complete, the output synchronizer 52 (FIG. 2) generates shift pulses denoted by the signal OSHIFT which is applied via lead 298 to the registers 294 and 296 to cause the data word to be shifted from the registers 294 and 296 out through gate 286. The clear data word is then modulo-2 added in the gate 286 with the random key word previously stored in the key storage 64 (FIG. 2) and is output as enciphered text via a lead 300 and applied through multiplexer 302.

If the Off-line mode of operation is selected, the clear data text stored in register 250 is operated upon as previously described in order to prevent the generation of a forbidden control character. The clear data is then applied, solely under the control of the synchronizer 50, through flipflops 306 and 308 to the modulo-2 adder 284. The clear data word is then modulo-2 added with the random key word generated by the random code generator and the resulting enciphered data is applied via lead 310 to the multiplexer 302. Multiplexer 302 comprises a four-pole two-position switch which is controlled by the OFFLINE signal applied via lead 312, which selects whether or not modulo-2 adder 284 or 286 is utilized.

The operation of the system when in the decoding mode is the reverse of the encoding operation previously described. The encoded digital data is received as the INDAT signal and is applied to the register 250. The randomized key word is stored in the register to be subsequently described in FIG. 7, and bits 6 and 7 are compared between the encoded data word and the randomized key signal at gate 280. If the modulo-2 added signals at the output of gates 270 and 272 comprise logic zeros, thus indicating that bits 6 and 7 of the encoded word and the randomized key data are the same, then it will be apparent that changes have been made during the encoding process to prevent the generation of a forbidden control character. Thus, the bits 6 and 7 of the encoded word stored in register 250 are changed to logic zero. The encoded word stored in register 250 is modulo-2 added with the randomized digital key word stored in the key storage register to provide a decoded clear text word at the output of either gate 284 or 286, dependent upon the operational mode of the system in the matter previously described.

A NAND gate 320 is connected between the outputs of the register 250 and a flipflop 322. The gate 320 detects the occurrence of the STX character in register 250 and the character is stored in flipflop 322 and is utilized by the controller to switch the device into the private state. Similarly, NAND gate 324 is applied to the outputs of the data register 250 and decodes the occurrence of the ETX character and is subsequently latched up in the flipflop 326. This is utilized by the controller to cause the device to switch into the clear state. The signal PRIV, which is applied to an input of the gate 280, indicates that the machine is in the private state. The signal IENDW denotes the wide end pulse from the input synchronizer 50.

The signal ISHIFT is applied to the NAND gate 330, the output of which is connected to the register 250. The ISHIFT signal denotes a shift pulse used to shift data into the data register 250 and is generated from the input synchronizer 50 (FIG. 2).

The signal IEND- denotes the end pulse and is utilized to cause a parallel loading of the register 240 if a forbidden control character has been detected. The signal CGD denotes code generator data which is present at all times, but the code generator only accepts data from this line during the receive prime mode in order to load the code generator with prime information.

The signal IPVT denotes that the machine is in the private or prime state and is timed according to the input synchronizer 50. The signal STXL denotes a latch signal indicating the occurrence of the STX character. The IPRIM- Signal indicates that the machine is in the prime state and is timed according to the input synchronizer 50. The ETXL- signal is a latch signal indicating the occurrence of the end of text character and is utilized to switch the machine back into the clear mode. The signal ISHIFT denotes a shift pulse from the input synchronizer 50 and is utilized to shift data into or out of the data register 250.

The signal OENDW is applied to the flipflop 266 and the multiplexer 302 to denote the end pulse from the output synchronizer 52. The signal OFFLINE dentoes that the machine is either in the Off-line or On-line mode and is controlled directly by the switch on the back panel of the device. The signal ENDW denotes the end wide pulse and may be under the control of either the input or the output synchroniqer, depending upon whether the machine is in the Off-line or On-line mode.

The signal BPT indicates buffered plain text and is either selected from the output of the data register 250 or the data registers 294 and 296, depending upon whether the machine is in the Off-line or On-line mode of operation. The signal CT indicates ciphered text and is selected from the outputs of either gate 284 or 286, depending upon whether the machine is operating in Off-line or On-line, as previously indicated The signal KBO denotes key bit zero and is transmitted from the key register of the key storage 64, shown in FIG. 2. Signal KBO is gated by signal DPRIV which indicates that the system is in the private state, and signal ICDENA which denotes that the data bits are present and that it is only this portion of the word that is desired to be enciphered. Similarly, signal BKBO indicates a buffered key bit zero and is the output of a buffered key word in the key storage 64, to be subsequently described. This signal is utilized in the On-line mode. The output labeled DBO indicates data bit zero and is the output of the data register 250.

Figure 6:
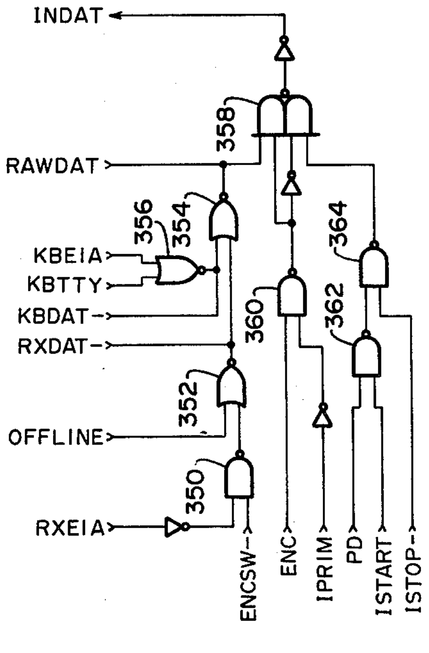
FIG. 6 is a schematic diagram of circuitry for selecting input data for insertion into the data storage circuitry shown in FIG. 5.

FIG. 6 is a schematic diagram of circuitry for selecting the input data for insertion into the data storage circuit shown in FIG. 5. The signals ENCSW and RXEIA are applied to the inputs of a NAND gate 350, the output of which is applied to the input of NOR gate 352, along with the signal OFFLINE. The signal RXDAT is generated by gate 352 and the resulting signals, along with the signal KBDAT-, are applied to the input of a NOR gate 354. Signals KBTTY and KBEIA are applied through a NOR gate 356 to an input of the gate 354. The RAWDAT signal generated by gate 354 is applied to an input of NAND gates 358. The signal ENC and the signal IPRIM are applied through a NAND gate 360 to an input of gates 358. Similarly, the signal PD (priming data) and ISTART-are applied through a NAND gate 362 and a NAND gate 364 to inputs of NAND gates 358. The signal ISTOP is also applied through gate 364 to gates 358. The resulting signal INDAT is applied to the register 250 in the circuit shown in FIG. 5.

KEY STORAGE

Figure 7:
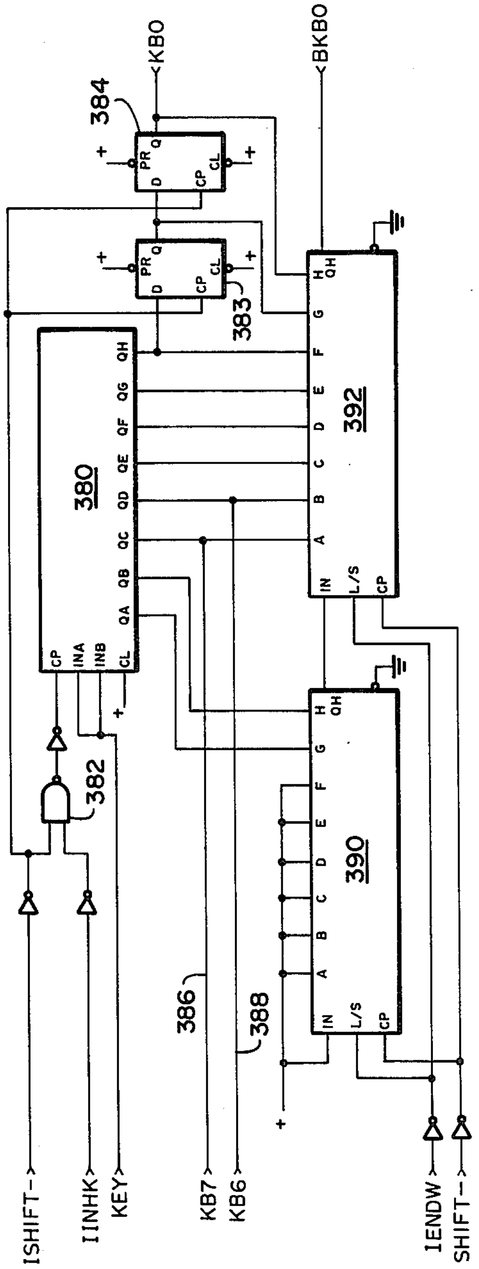
FIG. 7 is a schematic diagram of the key storage circuit of the invention.

FIG. 7 is a schematic diagram of the key storage circuitry of the invention. The randomized key data is shifted into a register 380 by the clock pulse ISHIFT- applied through a NAND gate 382. The clock pulse ISHIFT- is inhibited if the signal IINHK is present which denotes a forbidden control character. The generation of this signal will hold the previously generated key word in the register 380. Flipflops 383 and 384 are interconnected with register 380 to provide a 10-bit storage register. The sixth and seventh bits of the register 380 are routed to the circuitry shown in FIG. 5 of the leads 386 and 388 for use in the manner previously described.

Registers 390 and 392 comprise a buffered key register. The randomized key data, once it has been serially loaded into register 380–384, is then loaded in parallel into registers 390 and 392 under the control of signals IENDW and OSHIFT-. The output of register 392 is BKBO and is applied to the circuitry shown in FIG. 5 for enciphering or deciphering when the system is in the On-line mode. The output of flipflop 384 is labeled KBO and is applied to circuitry shown in FIG. 5 for use in the enciphering or deciphering of data when the system is in the Off-line mode. Registers 390 and 392 are shifted serially by the signal OSHIFT- and are loaded in parallel by the signal IENDW.

ALARM CIRCUIT

Figure 8:
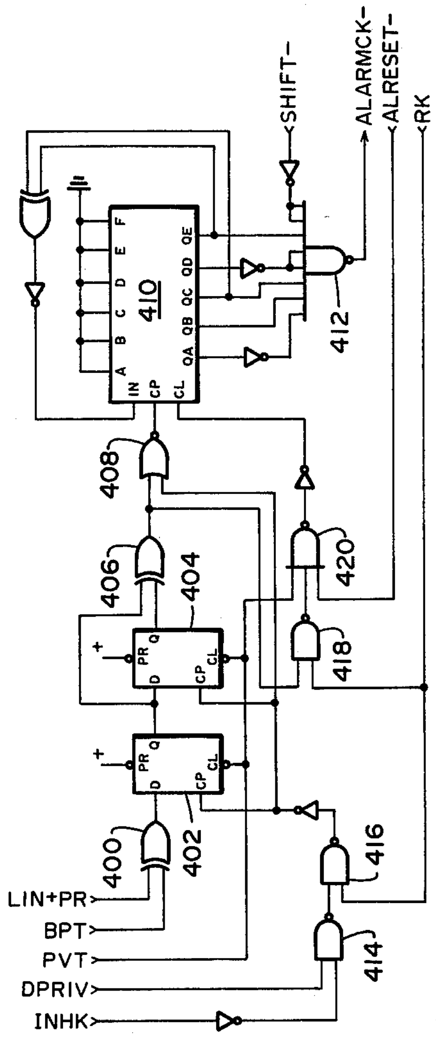
FIG. 8 is a schematic diagram of the alarm circuit of the invention.

FIG. 8 illustrates the alarm circuit of the invention. The purpose of the circuitry is to compare the plain data text with the enciphered data text, and upon the occurrence of approximately 24 bits of consecutive true comparisons or noncomparisons, an alarm condition will occur. The alarm condition thus denotes that the key generator has probably malfunctioned and is stopped at either a logic zero or one.

The alarm will detect not only the occurrence of plain text equal to enciphered text, but will also detect the occurrence of plain text being the inverse of the enciphered text. The plain or clear data text is applied as the signal BPT to an input of an exclusive OR gate 400. The enciphered text is denoted by the signal LIN+PR applied to the input of gate 400. If the signals are identical, gate 400 resets a flipflop 402 which subsequently resets flipflop 404. An exclusive OR comparator gate 406 then compares the results of the successive comparisons to determine whether or not two consecutive comparisons have resulted in similar states. If the comparator 406 detects two consecutive noncomparisons, a signal is applied through a NOR gate 408 to clear the counter 410. If 24 consecutive comparisons are reached, a limit is detected by gate 412 and the alarm check signal becomes a logic zero indicating the alarm condition. If the system is operating in the private state, the alarm signal will force the machine into the alarm state. The signals INHK and DPRIV are applied through a NAND gate 414, the output of which is applied, along with the signal RK, to inputs of a NAND gate 416. This signal RK is also applied to a NAND gate 418, along with the output of gate 406. The output of gate 418 is applied to the input of a NAND gate 420, along with the signal ALRESET and the signal PVT, to provide proper gating for the alarm circuit.

DATA SWITCHING CIRCUIT

The RAWDAT data which is input from the teletype, teleprinter, or from the modem is input to a toggle flipflop 450 which toggles on reception of the data. The output of the flipflop 450 is compared with the signal RAWDAT by an exclusive OR comparator gate 452. A parity check will now be complete and an indication of whether or not the parity is correct or incorrect is stored in a flipflop 454.

As previously described, parity checking of higher level coding schemes is known. In the odd parity technique, the number of logic ones is counted in the word to be transmitted and a parity bit of either zero or one is added to the word in order to provide an odd number of logic ones in the word. The word may then be received and the parity of the word detected to determine whether an error in transmission has occurred. In the more commonly used even parity technique, the number of logic ones in a word to be transmitted is counted and a parity bit of either zero or one is added to provide an even number of logic ones in the word to be transmitted. The present system provides circuitry to enable the use of either parity checking technique in a cryptographic system.

An exclusive OR comparator gate 456 changes the detection of parity from either the odd parity or even parity technique by applying a logic one or a logic zero to a pin 458. Flipflop 454 then stores the indication as whether or not correct or incorrect parity was received in the incoming data. This indication will be subsequently used when parity is regenerated for the resulting plain text data, as it is important that the operator of the system be aware of whether or not correct or incorrect parity was received in the encoded data. Thus, as will be later shown, the parity initially received is regenerated for the clear text data in order to prevent incorrect parity indications from being generated due to the enciphering process.

A flipflop 460 comprises a serial parity checker and toggles upon reception of the data. Exclusive OR modulo-2 adder circuits 462 and 464 determine whether the parity bit should be a one or a zero, depending upon the data received by the flipflop 460, and whether or not the system is in the receive mode and has detected a parity in the incoming data. The flipflop 470 and excluxive OR gate 472 generates the parity for the data to be applied through the line during transmission when the system is in the On-line mode. The On-line mode of operation requires two separate parity generators, since plain text is being applied to the teleprinter and enciphered text is being applied to line.

The data switching circuit also routes various data through the device. The signal CT is applied directly to an input of NAND gate 476. The signal ENC is applied through NAND gate 478 and through NOR gate 480 to inputs of the gate 476. The DPRIM signal is applied through NAND gate 482 and to the input of gate 476. The ALARM signal is applied to a gate 484 which gates the signal from gate 476. Only the correct data to be applied to the printer is applied through gate 484, via the parity checker gates 486 and 488 and to a synchronizing flipflop 490. After the data is synchronized, the data is applied to the printer via the interface circuitry as signal PRDAT*- The data to be applied to the line is applied to a NAND gate 494. Depending upon the state of the system and the mode of operation selected, the appropriate data is selected by gate 494 and is routed to the parity circuitry flipflop 470, gate 472 and a NAND gate 496 and is subsequently applied to a synchronizing flip-flop 498. The synchronized line data is then applied to the interface circuitry through the modem as signal LINEDAT*-.

Multiplexers 500 and 502 select either timing signals from the input synchronizer or the output synchronizer, depending upon whether or not the machine is operating in the Off-line or On-line mode. The timing signals are then utilized for various timing sequences throughout the machine. A register 504 is utilized during the receive priming state while the device is receiving random prime which is being routed into the code generator. During this time, a fill character needs to be generated and applied to the printer so that the prime data is not printed on the teleprinter. This character is generated by the register 504 and may be programmed in any manner desired. In an example, the machine may be supplied with the character known as the "Rub-Out" which causes a non-printing character to be applied to printer and does not cause the carriage return to be moved.

When the terminal labeled PROBESW is grounded, the logic gate 488 selects a group of gates 508, 510 and 512 for diagnostic purposes. Selection of these gates bypasses all of the logic in the device and merely applies to the teleprinter any signal applied to the PROBE terminal.

Figure 9:
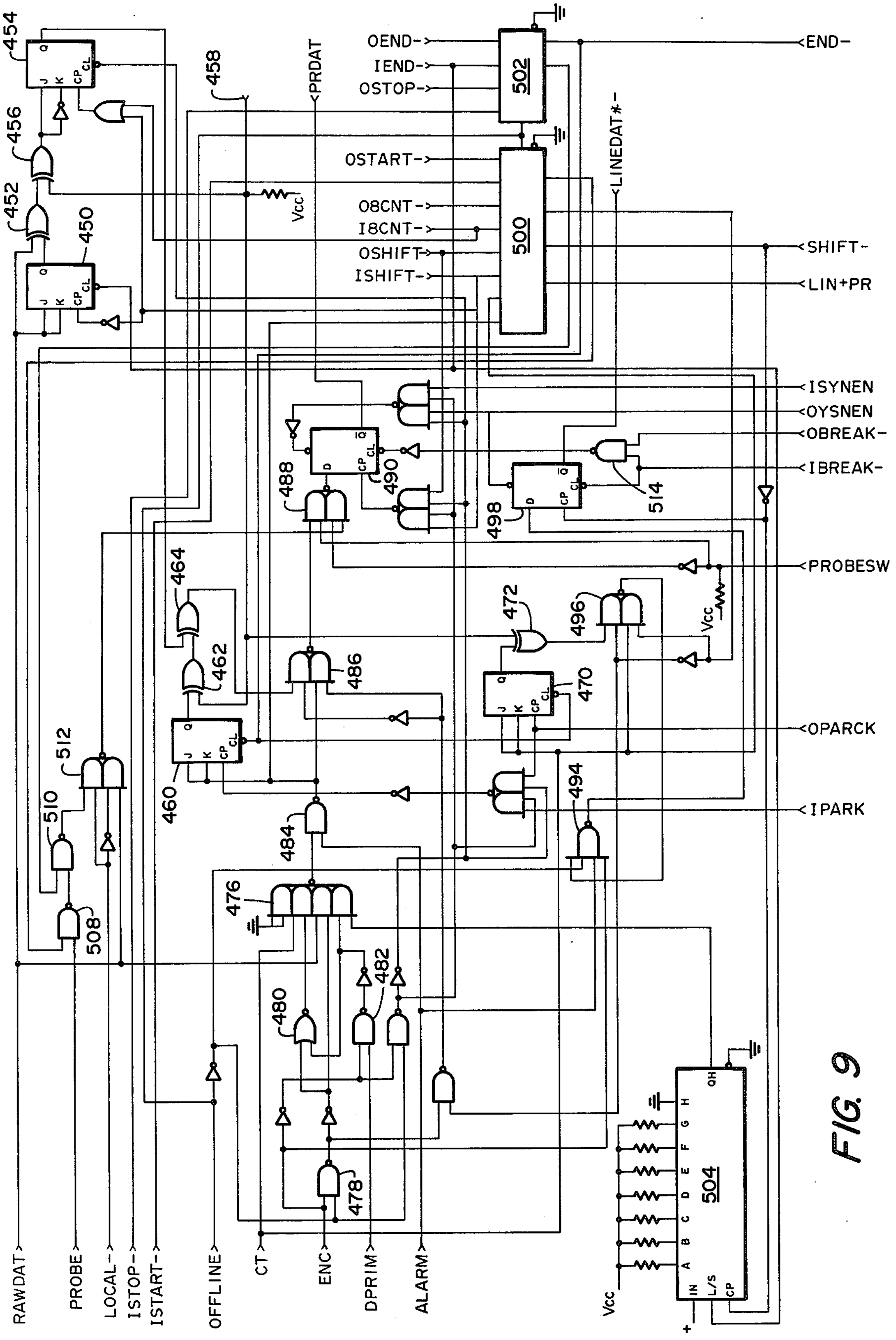
FIG. 9 is a schematic diagram of the data switching circuit of the invention.

Referring to the signals shown in FIG. 9, the IBREAK and OBREAK signals applied to flipflop 498 and through NAND gate 514 to flipflop 490 comprise the break signal derived from the input and output synchronizers. The signals OSYNEN and ISYNEN denote the output synchronizer enable and input synchronizer enable signals. The LINEDAT*- denotes synchronized data being applied to the line. The PRDAT*- denotes synchronized data to be applied to the printer, as previously noted. The LIN+PR signal denotes the cipher text which is to be utilized by the alarm circuit to compare with the plain text in the manner previously described. The SHIFT-signal is a gated shift pulse which is either the SHIFT- pulse from the output or input synchronizers. The The END- signal denotes the end pulse as detected by either the input synchronizer or the output synchronizer, depending upon which mode of operation the system is operating in.

The present system thus comprises an extremely useful cryptographic device for digital data transmission. The present system provides uncomplicated automatic use of higher level codes, and in particular eight-level codes, and automatically prevents the generation of enciphered words which comprise forbidden control characters. The present system enables parity checking and may be utilized in higher level digital transmission systems without any required changes in the transmission systems. The present system maintains extremely secure digital transmission and is provided with alarm and fail-safe functions.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A cryptographic system operating under a digital coding scheme having forbidden control characters with common characteristics comprising:

means for storing clear digital words and randomized digital words each having n bits, circuitry for enciphering less than n bits of each of said clear digital words with less than n bits of each of said randomized digital words to generate encoded bits, means for varying said stored clear digital words upon the occurrence of said common characteristics in said encoded bits indicative of said forbidden control characters, and means responsive to said stored clear digital words and said randomized digital words for generating encoded digital characters.

2. The cryptographic system of claim 1 wherein said combining circuitry comprises modulo-2 addition circuitry.

3. The cryptographic system of claim 1 wherein said digital coding scheme comprises an eight level code.

4. The cryptographic system of claim 1 wherein said common characteristics comprise common binary levels of common bit positions.

5. The cryptographic system of claim 1 wherein said common characteristics comprise logic zero levels of the sixth and seventh bit positions in an eight level coding scheme.

6. The cryptographic system of claim 1 wherein said stored clear digital words are varied by changing the binary value of predetermined bit positions.

7. In a cryptographic system operating under an eight level digital coding scheme having forbidden control characters with common characteristics in the sixth and seventh bits, the combination comprising:

means for generating randomized digital words having eight digital bits, means for combining the sixth and seventh digital bits of each randomized digital word with the sixth and seventh digital bits of each eight bit clear digital words to generate pairs of encoded bits, means responsive to said pairs of encoded bits for detecting said common characteristics of said forbidden control characters, means responsive to said detecting means for changing said sixth and seventh bits of a clear digital word upon the occurrence of said common characteristics in order to prevent the generation of a forbidden control character, and means for combining said randomized digital words with said clear digital words to generate encoded digital data.

8. The combination of claim 7 wherein said digital coding scheme has at least eight levels and further comprising:

registers for storing said randomized digital bits and said clear digital data, adder means for modulo-2 adding selected bits of said randomized digital bits and said clear digital data, logic means for detecting a predetermined digital value of the output of said adder means, and means responsive to said logic means for varying the digital value of said selected bits of said clear digital data.

9. The combination of claim 7 wherein said predetermined digital value comprises logic zero for a pair of digital bits.

* * * * *